United States Patent
Yoshida

[11] Patent Number: 6,094,254
[45] Date of Patent: Jul. 25, 2000

[54] OPTICAL SYSTEM, METHOD FOR ARRANGING POINT LIGHT SOURCES IN THE OPTICAL SYSTEM, AND IMAGE SCANNING EXPOSURE APPARATUS

[75] Inventor: Futoshi Yoshida, Kanagawa, Japan

[73] Assignee: Fuji Photo Film Co., Ltd., Kanagawa, Japan

[21] Appl. No.: 09/056,865

[22] Filed: Apr. 8, 1998

[30] Foreign Application Priority Data

Apr. 9, 1997 [JP] Japan ................................. 9-090741

[51] Int. Cl.$^7$ ............................ G03B 27/52; G03B 27/54
[52] U.S. Cl. .................................. 355/47; 355/70
[58] Field of Search .......................... 355/84, 27, 40–41, 355/53, 18, 70, 52; 362/11; 347/238

[56] References Cited

U.S. PATENT DOCUMENTS

| | | | |
|---|---|---|---|
| 4,435,064 | 3/1984 | Tsukada et al. ............................ | 355/1 |
| 4,866,478 | 9/1989 | Kasahara et al. ........................ | 355/70 |
| 4,987,540 | 1/1991 | Yamada et al. ............................ | 355/1 |
| 5,477,259 | 12/1995 | Iwasa ...................................... | 347/238 |
| 5,663,782 | 9/1997 | Saita et al. ................................ | 355/37 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

A plurality of LED chips is turned on at theoretical arrangement pitches. The distance between a theoretical imaging point of one LED chip located farthest from an optical axis and the optical axis, and the distance between an actual imaging point and the optical axis are obtained. With the increasing ratio of the distances being set as a reference, the positions where the LED chips are arranged are shifted in a direction opposite to that of the displacement caused by distortion aberration. The further the LED chip is located from the optical axis, the larger the amount of displacement thereof becomes. Further, the nearer the LED chips is located to the optical axis, the smaller the amount of displacement thereof becomes. As a result, the LED chips are arranged on a substrate in such a configuration that compensation for the distortion aberration produced on the photosensitive material can be achieved.

13 Claims, 8 Drawing Sheets

OPTICAL SYSTEM, METHOD FOR ARRANGING POINT LIGHT SOURCES IN THE OPTICAL SYSTEM, AND IMAGE SCANNING EXPOSURE APPARATUS

BACKGROUND OF THE INVENTION

1. Field of the Invention

The present invention relates to an optical system, an image scanning exposure apparatus, and a method for arranging point light sources in the optical system, wherein the optical system is formed by a light source portion comprising a plurality of point light sources mounted on a substrate, and by a single imaging lens system which allows light from the light source portion to form an image, and wherein the image scanning exposure apparatus includes a light source portion with a plurality of point light sources mounted on a substrate, a single imaging lens system which allows light from the light source portion to form an image on a photosensitive material, a main scan driving system which moves a unit integrally structured by the light source portion and the imaging lens system in a predetermined main scanning direction, and a sub-scan driving system which moves the photosensitive material stepwise in a direction perpendicular to the main scanning direction for each main scanning operation.

2. Description of the Related Art

Currently, a number of image exposure apparatuses each having a digital exposure system mounted thereon have been developed. Generally, in the digital exposure system, an image is recorded on a recording medium in such a manner that a light beam outputted from a semiconductor laser is modulated with image data and deflected by the high-speed rotation of a polygon mirror (main scanning), and the light beam reflected by the polygon mirror is further subjected to sub-scanning by a galvano mirror or the like, or the above main scanning is effected repeatedly while the recording medium is moved (or the recording medium is moved stepwise). Here, as the recording medium, a photosensitive drum electrified by corona discharge, or a photosensitive material may be used. Further, in place of the semiconductor laser, another light emitter such as a light emitting diode (LED) may be used as a light source.

Here, there exists a main scanning system in which a plurality of light sources are arranged in a matrix form longitudinally and crosswise and a main scanning operation of a plurality of lines can be effected by one main scanning movement.

In this case, when a structure having a single lens system is used to form an image on a recording medium, pincushion distortion (see FIG. 7C) or barrel distortion (see FIG. 7D) is caused on an imaging surface due to distortion aberration. The size or form of the distortion varies depending on the optical system being used (degree of lens aberration, length of an optical path, focal length, and the like) and is set by determining setting conditions such as the arrangement of the optical system.

Non-uniformity of intervals among main scanning lines arises due to the distortion aberration, thereby resulting in deterioration of image quality.

SUMMARY OF THE INVENTION

In view of the above-described circumstances, it is an object of the present invention to provide an optical system which, when an image is formed with light from a plurality of point light sources by using a single imaging lens system, lens aberration is corrected to allow formation of the image at a desired position and also to provide a method for arranging point light sources in the optical system.

Further, it is another object to provide an image scanning exposure apparatus which, when an image is recorded by main scanning and sub-scanning with light from a plurality of point light sources, non-uniformity of intervals among main scanning lines which is caused by lens aberration is prevented, thereby improving image quality.

A first aspect of the present invention is an optical system comprising a light source portion having a plurality of point light sources mounted on a substrate, and a single imaging lens system which allows light from the light source portion to form an image, wherein the point light sources on the substrate are arranged, based on optical properties of the imaging lens system including distortion aberration, so that respective images of the point light sources at image surface focal positions are positioned in a desired arrangement.

It is well known that the relative positional relationship among respective images formed by the point light sources is not made identical to that among the plurality of point light sources due to optical characteristics, particularly, distortion aberration of the imaging lens system and pincushion distortion or barrel distortion is thereby caused.

Therefore, according to the first aspect of the present invention, by providing an arrangement of point light sources in consideration of distortion resulting from the optical characteristics, images having a desired arrangement can be formed.

A second aspect of the present invention is a method for arranging point light sources on a substrate in an optical system comprising a light source portion having a plurality of point light sources mounted on the substrate, and a single imaging lens system which allows light from the light source portion to form an image, the method comprising the steps of: setting a relative positional relationship among the point light sources, the imaging lens system, and imaging surface focal positions; determining whether a form of distortion aberration produced at the imaging surface focal positions is pincushion distortion or barrel distortion in the set relative positional relationship; based on a degree of the determined distortion aberration, obtaining a form of distortion aberration to compensate for the determined distortion aberration; and determining an arrangement of the plurality of point light sources on the substrate in the form of the obtained distortion aberration and based on an inverse number of the imaging magnification.

According to the second aspect of the present invention, in order that the relative positional relationship among the images formed by the plurality of point light sources be made identical to that among the point light sources, first, the relative positional relationship among the point light sources, the imaging lens system, and the image surface focal positions is set. The degree of distortion aberration is determined by the above three relative positions.

Next, by observing the images formed by the point light sources, it is determined whether the distortion aberration is produced as pincushion distortion or barrel distortion. As the result of this determination, namely, based on an inverse function of the degree of distortion aberration and an inverse number of the imaging magnification, arrangement of the point light sources on the substrate is determined.

For example, when barrel distortion is generated when the magnification is set at a one-third fold, pincushion distortion is obtained in the same degree as that of the barrel distortion and the obtained pincushion distortion is magnified three times to become an arrangement of the point light sources.

A third aspect of the present invention is an image scanning exposure apparatus comprising: a light source portion having a plurality of point light sources mounted on a substrate; a single imaging lens system which allows light from the plurality of point light sources to form an image on a photosensitive material; a main scan driving system which moves a unit, in which the light source portion and the imaging lens system are integrally structured, in a predetermined main scanning direction; and a sub-scan driving system which moves the photosensitive material stepwise in a direction perpendicular to the main scanning direction for each main scanning operation, wherein the point light sources on the substrate are arranged, based on optical properties of the imaging lens system including distortion aberration, so that respective images of the point light sources are arranged in straight lines on the photosensitive material in longitudinal and transverse directions.

According to the third aspect of the present invention, in the same manner as in the first and second aspects, the plurality of point light sources is mounted on the substrate and a plurality of main scanning lines is formed in one main scan driving operation. In this case, non-uniformity in the pitches of the main scanning lines is caused by the distortion aberration. Accordingly, when the plurality of main scanning lines is formed simultaneously, by mounting the point light sources on the substrate (for example, by the method according to the second aspect) so as to compensate in advance for the degree of distortion aberration, the main scanning line pitches can be made uniform.

Meanwhile, distortion aberration may also be corrected by providing a separate optical system for correcting distortion aberration (for example, a lens or a reflecting mirror). Alternatively, the imaging surface may be curved correspondingly to the distortion aberration.

DESCRIPTION OF THE PREFERRED EMBODIMENTS

[Overall Structure (Exterior View)]

Figure 1:
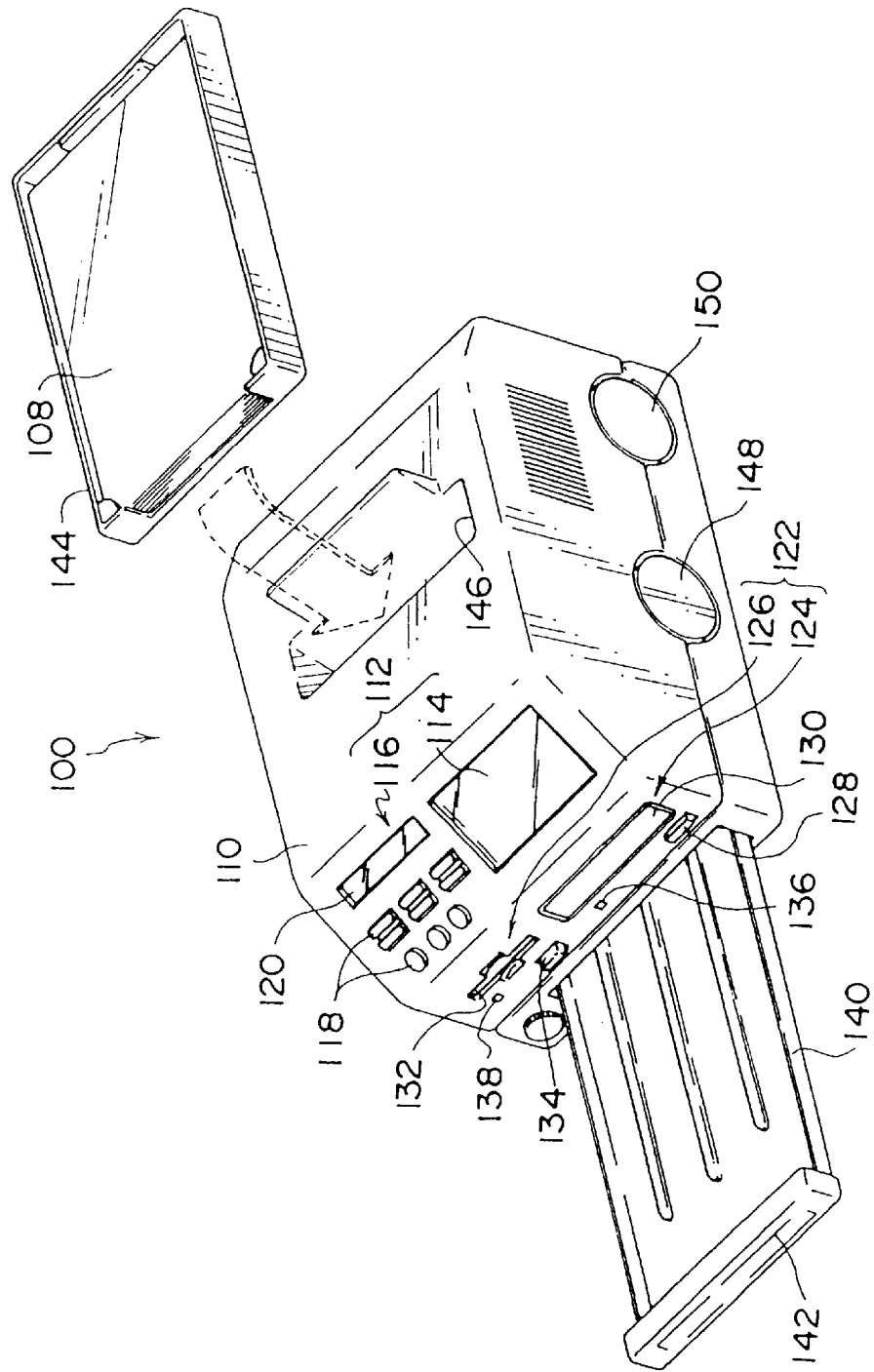
FIG. 1 is a perspective view of an image exposure apparatus according to an embodiment of the present invention.
Figure 2:
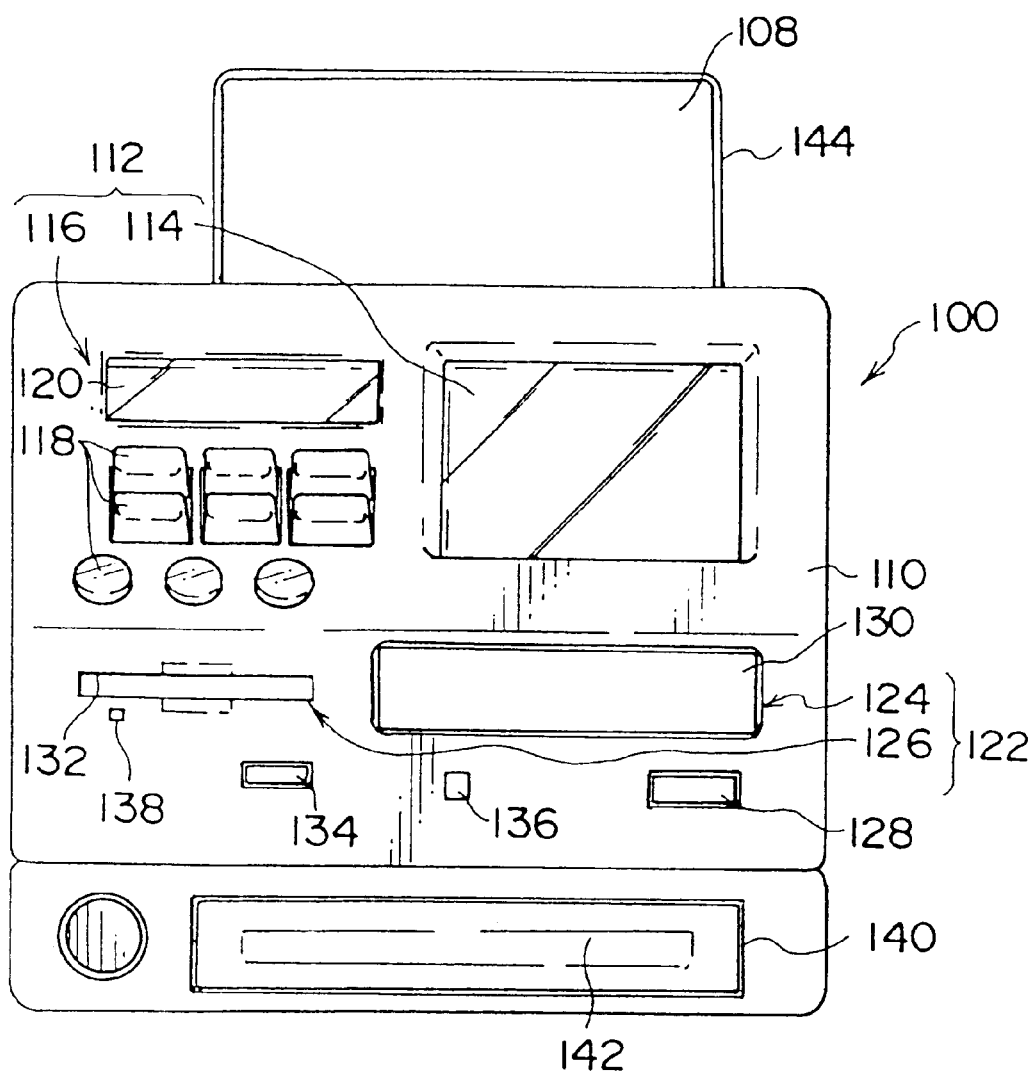
FIG. 2 is a front view of the image exposure apparatus according to the embodiment of the present invention.
Figure 3:
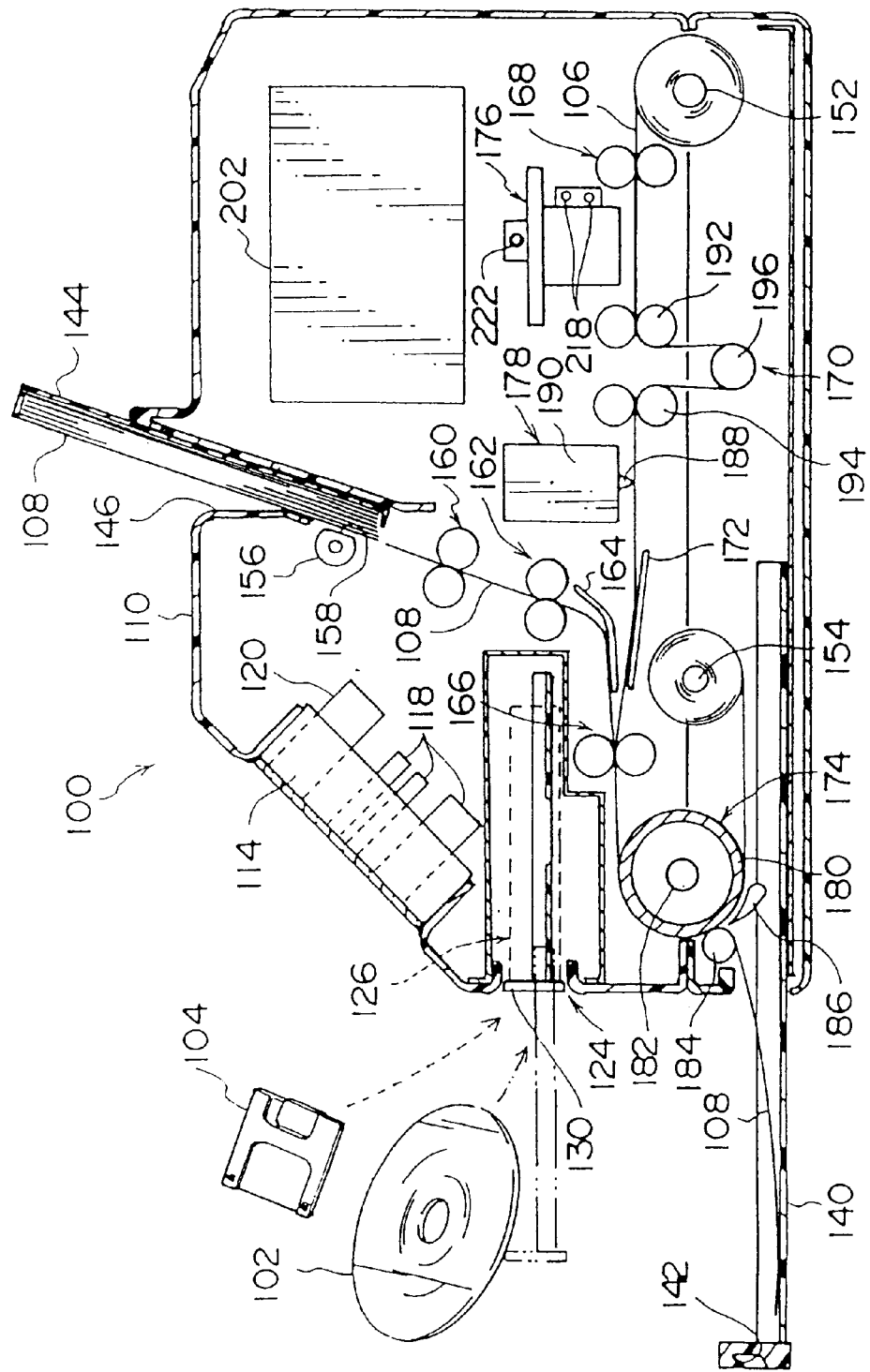
FIG. 3 is a cross-sectional side view which shows an internal structure of the image exposure apparatus according to the embodiment of the present invention.

Referring now to FIGS. 1 through 3, there is shown an image recording apparatus 100 according to an embodiment of the present invention.

The image recording apparatus 100 reads image data recorded on a CD-ROM 102 or an FD 104 (which are both shown in FIG. 3) and outputs the data to expose onto a photosensitive material 106, and transfers an image recorded on the photosensitive material 106 to a plain paper (an image receiving paper 108).

An upper portion of the front surface of a box-shaped casing 110 (at the left side on the paper of FIG. 3) is formed as an inclined surface and an operation display portion 112 is provided thereon.

As shown in FIG. 2, the operation display portion 112 is divided into a monitor portion 114 and an input portion 116 which are disposed at right and left sides, respectively. The monitor portion 114 allows the read image to be displayed thereon.

Further, the input portion 116 includes a plurality of operation keys 118 and a display portion 120 for confirmation of input data and can input data which is required for image recording, for example, the number of sheets to be recorded, size setting, color-balance adjustment, and negative/positive selection.

A deck portion 122 is provided below the operation display portion 112. The deck portion 122 is formed by a CD-ROM deck portion 124 and an FD deck portion 126 which are disposed at right and left sides, respectively, of FIG. 2.

The CD-ROM deck portion 124 is provided in such a manner that a tray 130 can be opened and closed by pressing an open/close button 128. The CD-ROM 102 can be loaded in the interior of the apparatus by placing the CD-ROM on the tray 130.

An FD insertion slot 132 is provided in the FD deck portion 126. When the FD 104 is inserted in the FD insertion slot 132, a driving system within the apparatus is actuated to insert the FD 104 into the apparatus. Further, in order to take out the FD 104 from the FD deck portion 126, an operation button 134 is pressed to take out the FD 104.

Further, access lamps 136 and 138 are respectively provided for the CD-ROM deck portion 124 and the FD deck portion 126 and are each provided to be turned on during access within the apparatus.

A discharge tray 140 is provided further below the deck portion 122. The discharge tray 140 is usually accommodated within the apparatus and is provided to be taken out by the finger of an operator being placed on a holding portion 142 (see FIG. 1).

The image receiving paper 108 on which the image is recorded is discharged onto the discharge tray 140.

The image receiving paper 108 is accommodated in advance on a tray 144 in layers. The tray 144 is loaded in a tray loading aperture 146 formed on an upper surface of the casing 110. The image receiving papers 108 are taken out one by one from the tray 144 loaded in the tray loading aperture 146, and after images are transferred onto the image receiving papers 108, these image receiving papers 108 are each guided to the discharge tray 140.

Two circular cover members 148 and 150 are attached to the right side surface of the casing 110 (toward the front side on the paper of FIG. 1). These cover members 148 and 150 are each provided so as to be independently removable. As shown in FIG. 3, a take-up reel 154 and a feed reel 152 onto which the rolled photosensitive material 106 is wound are disposed within the apparatus along the axial directions of the cover members 148 and 150, respectively. These reels 152 and 154 can be taken out from or loaded into the apparatus in a state in which the covers 148 and 150 are removed.

Image Receiving Paper Conveying System

As shown in FIG. 3, the tray 144 loaded in the tray loading aperture 146 is provided in such a way that an upper surface of the leading end of the tray (the side where the tray 144 is loaded in the tray loading aperture 146) faces a semicircular roller 156.

The semicircular roller 156 is formed by cutting a cylindrical roller along a plane parallel to an axis thereof. Usually, the cut surface 158 of the semicircular roller 156 faces an uppermost image receiving paper 108 within the tray 144 with a space formed therebetween. When the semicircular roller 156 rotates, the image receiving paper 108 of the uppermost layer and the peripheral surface of the semicircular roller 156 contact each other, and the image receiving paper 108 is pulled out by a small amount when the semicircular roller 156 makes one rotation. The pulled-out image receiving paper 108 is nipped between a first roller pair 160 and is completely pulled out from the tray 144 by the driving force of the first roller pair 160.

A second roller pair 162, a guide plate 164, and a third roller pair 166 are sequentially disposed on the downstream side of the first roller pair 160. After having been nipped by the first roller pair 160, the image receiving paper 108 is nipped by the second roller pair 162, guided by the guide plate 164, and further nipped by the third roller pair 166.

The image receiving paper 108 overlaps with the photosensitive material 106 at the third roller pair 166. Namely, the third roller pair 166 is also used as a conveying path of the photosensitive material 106.

Photosensitive Material Conveying System

The photosensitive material 106 is loaded into the apparatus in an elongated state and wound onto the feed reel 152 in a layered form. The feed reel 152 is loaded in a predetermined position in such a manner that the cover member 150 (at the rear side of the apparatus) is removed and the feed reel 152 is inserted into the apparatus in the axial direction thereof.

With the photosensitive material 106 being loaded in the predetermined position, the leading end of the photosensitive material is pulled out at the initial stage and loading of the photosensitive material 106 is effected along a predetermined conveying path. The loading sequence consists of the outermost layer of the photosensitive material 106 being pulled out from the feed reel 152, nipped by a fourth roller pair 168 in the vicinity of the feed reel 152, conveyed through a reservoir portion 170 and a guide plate 172, and is nipped by the third roller pair 166, and thereafter, being entrained onto a heat roller 174 and a take-up reel 154 sequentially. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the photosensitive material 106 has been exposed imagewisely in the exposure section 176, the photosensitive material 106 is laminated with the image receiving material 108 at the third roller pair 166 in a state in which the emulsion surface (i.e., the surface to be exposed) is wet from the application of water.

Heat Roller

The heat roller 174 serves as a heat development-transfer section of the apparatus and is formed by a cylindrical roller main body 180 and a heater 182 provided within the roller main body 180 along the axial direction of the roller main body. The heat roller 174 serves to apply heat to members wound onto the roller main body 180 (i.e., the photosensitive material 106 and the image receiving material 108) by heating the surface of the roller main body 180 through the operation of the heater 182. The heating of the heat roller 174 enables heat development-transfer processing and the image recorded on the photosensitive material 106 is thereby transferred onto the image receiving paper 108.

A peeling roller 184 and a peeling claw 186 are disposed at a lower right side and in the vicinity of the heat roller 174 and are provided to separate the image receiving paper 108, which has been wound onto the heat roller 174 by a length of about one third the overall circumference of the heat roller 174 from the photosensitive material 106, and to guide the image receiving paper 108 toward the discharge tray 140.

On the other hand, the photosensitive material 106 is wound onto the heat roller 174 by a length of about half the overall circumference of the heat roller and is turned in an opposite direction to be guided to a position where the take-up reel 154 is mounted.

Water Applying Portion

As shown in FIG. 3, the water applying portion 178 performs the task of a heat developer by imparting water, which serves as an image forming solvent, onto the photosensitive material 106 or the image receiving paper 108 to allow the laminating surfaces of the photosensitive material 106 and the image receiving paper 108 to closely adhere to each other. The water applying portion 178 is formed by an elongated applying member 188 extending along a transverse direction of the photosensitive material 106 and a tank 190 which is filled with water.

The applying member 188 is formed of a high water-absorptive material, for example, felt, sponge, or the like, having a suitable degree of hardness and is disposed so as to contact the photosensitive material 106 at a predetermined pressure during conveying of the photosensitive material 106. The water in the tank 190 is constantly supplied to the applying member 188 in a suitable quantity through capillary action. When the photosensitive material 106 and the applying member 188 contact each other, water is applied to the surface (i.e., the emulsion surface) of the photosensitive material 106 by the applying member 188.

Further, since the applying member 188 abuts against the photosensitive material 106 at an appropriate pressure, water is uniformly applied to the photosensitive material 106.

Replenishment of the water in the tank 190 is effected by removing the entire water applying portion 178 from the apparatus, but water may be constantly supplied from an exterior of the apparatus by using a pipe arrangement.

Moreover, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, a hydrophilic heat solvent, or the like may also be used.

Exposure Section

Figure 4:
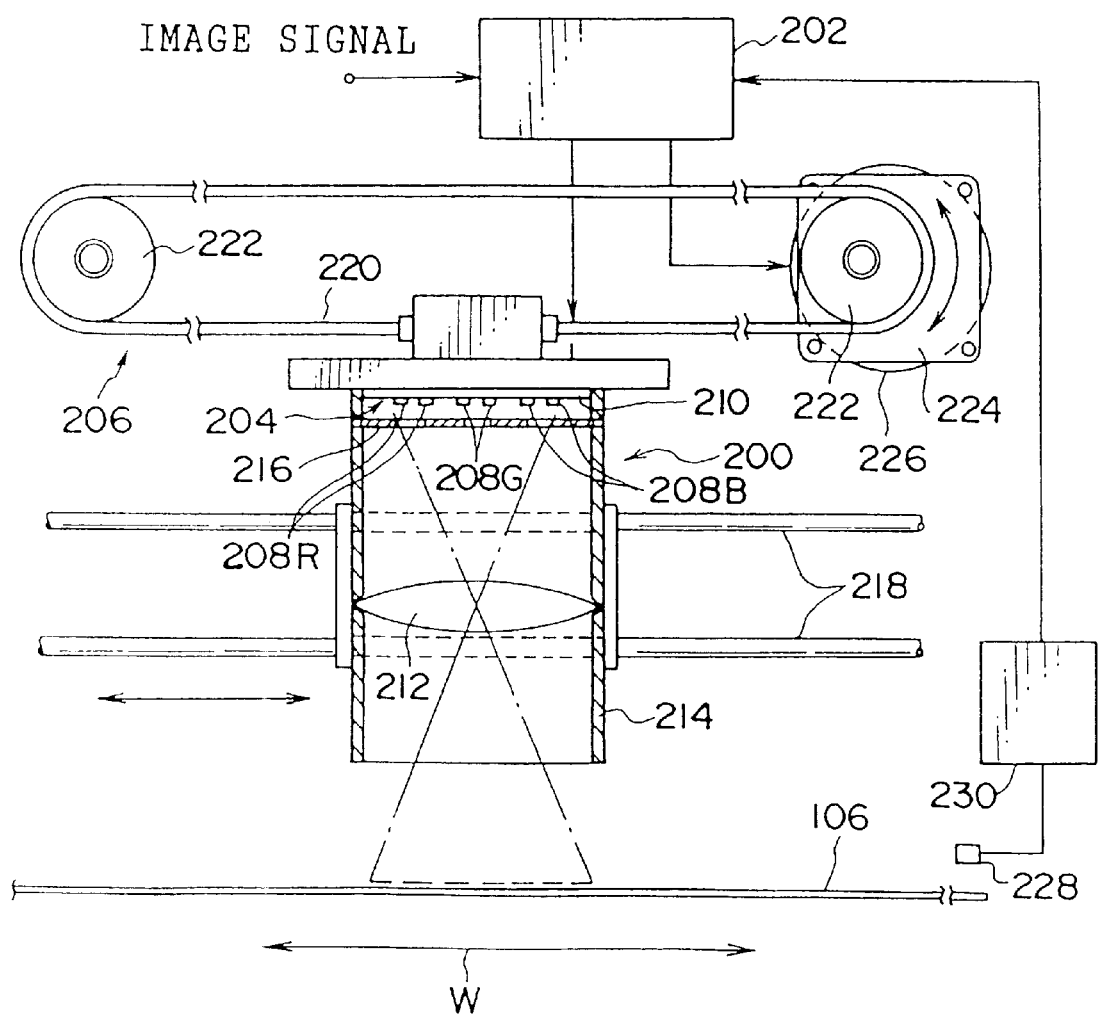
FIG. 4 is a schematic front view which shows a structure of an exposure section.

FIG. 4 shows an exposure section 176 according to the present embodiment.

The exposure section 176 is mainly formed from a light source unit 200 which is provided above the conveying path of the photosensitive material 106 and which is connected to a controller 202. An image signal (the image signal read from the CD-ROM 102 or FD 104) is stored in the controller 202 and a light source portion 204 within the light source unit 200 is turned on in accordance with the image signal. The light source unit 200 is provided so as to be movable in the transverse direction of the photosensitive material 106 (i.e., the main scanning direction) when driven by a main scanning unit 206, which will be described later. The main scanning is effected when the photosensitive material 106 stops during step driving in the exposure section 176.

The light source unit 200 of the exposure section 176 is covered by a box-shaped exposure casing 214. A full-color-image forming light source portion 204 is disposed on the upper end surface of the exposure casing 214 and a light emission surface of the full-color-image forming light source portion 204 is directed toward the interior of the exposure casing 214. An aperture 216 is provided on the side of the light emission surface of the full-color-image forming light source portion 204 to limit spread of light from a plurality of LED chips 208 (eleven LED chips for each color).

A lens 212 is provided on the downstream side of the aperture 216 and at the central portion of the exposure casing 214 and serves to converge light from the full-color-image forming light source portion 204 to form an image on the photosensitive material 106. The resolution of light for image formation is about 300 to 400 dpi. The lens 212 is shown as a single body, but a single lens system formed by a combination of a plurality of lenses may also be provided.

In this case, the lens 212 is formed by a plurality of lenses and an aperture and is characterized by the magnification thereof not varying even when the height of an image surface changes somewhat. The lens 212 can eliminate minute errors occurring during the main scanning movement of the main scanning unit 206, or generated by the state in which the LED chips 208 are mounted.

Further, the focus of the lens 212 is constantly adjusted by an automatic focusing mechanism (not shown).

The light source unit 200 is supported by a pair of guide shafts 218 disposed parallel to each other and forming a part of the main scanning unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to the reciprocating rotation of the stepping motor 226, the light source portion 204 is moved along the guide shafts 218 in a reciprocating manner.

The driving of the stepping motor 226 is controlled by the controller 202 and is synchronized with the step driving of the photosensitive material 106. Namely, in the state in which the photosensitive material 106 has moved by one step and is stopped, the stepping motor 226 starts rotating to move the light source portion 204 on the photosensitive material 106 along the transverse direction of the photosensitive material 106. When the stepping motor 226 is rotated in the reverse direction after a predetermined number of pulses has been confirmed, the light source portion 204 returns to its original position. Subsequent movement of the photosensitive material 106 starts simultaneously with the returning motion of the light source portion 204.

A photodiode 228 is provided at the light emitting side in the light source unit 200 so as to face the photosensitive material 106 and outputs a signal corresponding to the quantity of light from the light source from the full-color-image forming light source portion 204. The photodiode 228 is connected to a light-quantity correction unit 230 and the signal corresponding to the quantity of light is inputted to the light-quantity correction unit 230.

The light-quantity correction unit 230 compares the respective quantities of light from the LED chips 208 of each of the detected colors to adjust density and color balance, and further outputs a correction value to the controller 202. The image signal to be transmitted to the light source portion 204 is corrected based on the correction value and each LED chip 208 is turned on with the proper quantity of light.

Figure 5:
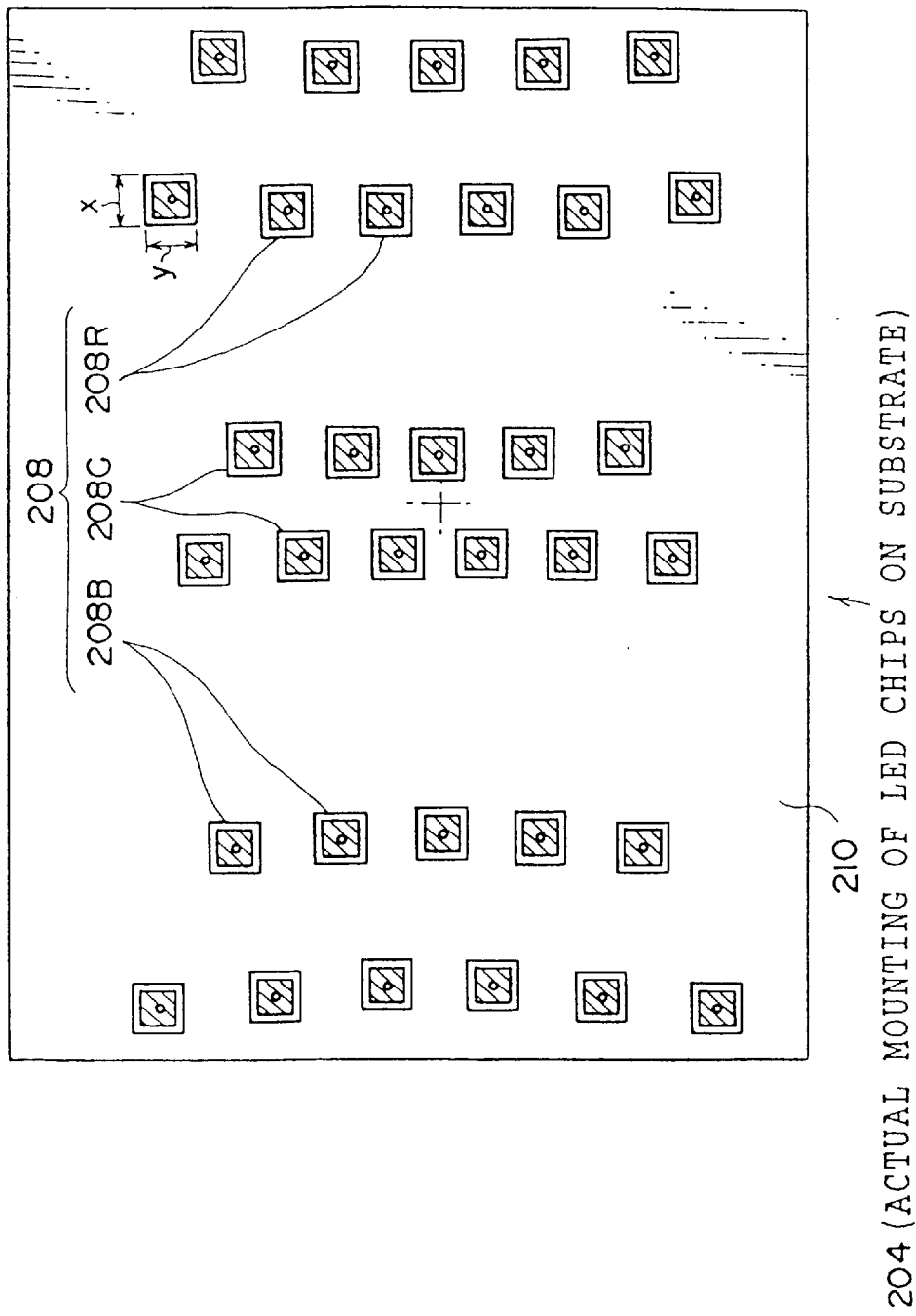
FIG. 5 is a plan view which shows an actual arrangement of LED chips in a full-color-image forming light source portion of an exposure section.

As shown in FIG. 5, the full-color-image forming light source portion 204 is formed with the plurality of LED chips 208 being arranged in groups. A plurality of sets of LED chips 208, each set thereof emitting light in colors of blue (B), green (G), and R (red) (when described below for each of the colors, the LED chip which emits blue light is referred to as B-LED chip 208B, the LED chip which emits green light is referred to as G-LED chip 208G, and the LED chip which emits red light is referred to as R-LED chip 208R), are mounted onto a substrate 210 along the transverse direction of the photosensitive material 106 (i.e., the main scanning direction), each following the same stipulated layout. In the present embodiment, eleven sets of LED chips are provided on the substrate. Namely, on the substrate 210 in the plan view shown in FIG. 5, eleven B-LED chips 208B are arranged in two rows in a zigzag manner at the right edge, eleven R-LED chips 208R are arranged in two rows in a zigzag manner at the left edge, and eleven G-LED chips 208G are arranged in two rows in a zigzag manner in the center. Accordingly, the LED chips 208 are arranged in a total of six rows.

A predetermined wiring arrangement is provided on the substrate 210 by etching processing or the like and each wire is covered by metal for thermal radiation so as not to cause a short circuit between the wires. For this reason, generation of heat due to the LED chips 208 being turned on can be restricted, and variations in the amount of light emitted can also be limited. The dimensions of each LED chip 208 (x×y) are about 360×360 $\mu$m.

Figure 6:
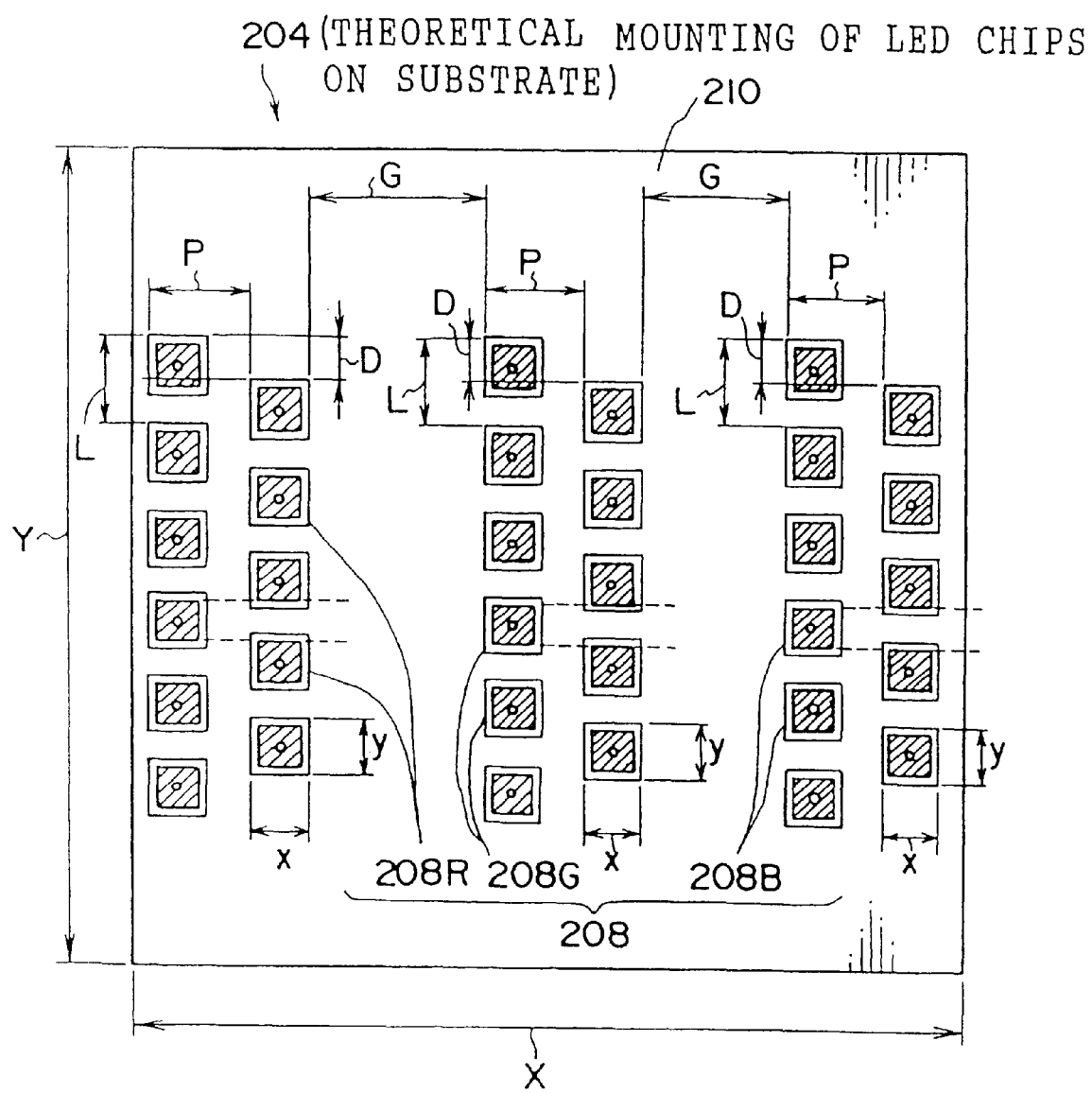
FIG. 6 is a plan view which shows a theoretical arrangement of the LED chips in the light source portion shown in FIG. 5.

As shown in FIG. 6, the row pitch P of the same color LED chips 208 to be mounted on the substrate 210 in theory (design) is 600 $\mu$m, the line pitch L of each row of the LED chips is 520 $\mu$m, and the distance D of a stepped portion formed in the zigzag arrangement along the vertical direction of the substrate is 260 $\mu$m. The respective distances G between the R-LED chips 208R and the G-LED chips 208G, and between the G-LED chips 208G and the B-LED chips 208B, are preferably equal to each other. The diagonal line section of each of the LED chips 208 shown in FIG. 6 is a region from which light is actually emitted. As shown in the dotted lines shown in FIG. 6, the borders of the light emission regions in the adjacent zigzag rows of LED chips are disposed so as to line up with each other.

Here, the above-described dimensions (see FIG. 6) are set on condition that light from the LED chips 208 theoretically allows formation of images on a flat surface (image surface) of the photosensitive material 106 in the same manner as in the arrangement of the LED chips 208 on the substrate 210.

Figure 7A:
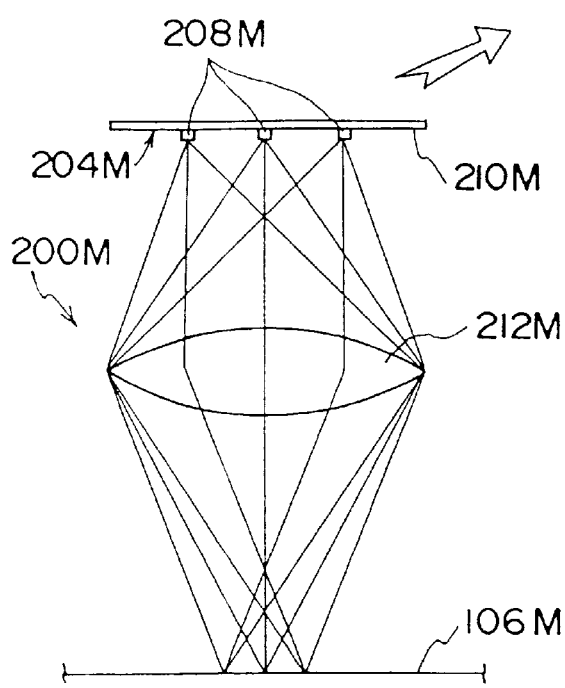
FIG. 7A is a model diagram of an optical system applied correspondingly to FIG. 4.
Figure 7B:
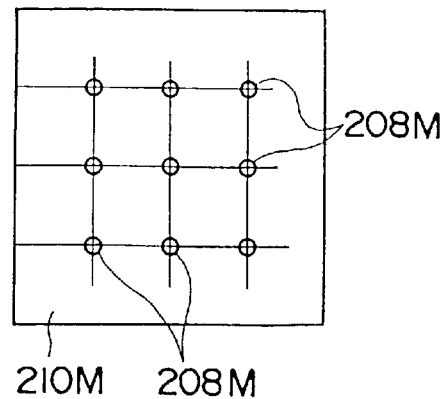
FIG. 7B is a plan view of a substrate.
Figure 7C:
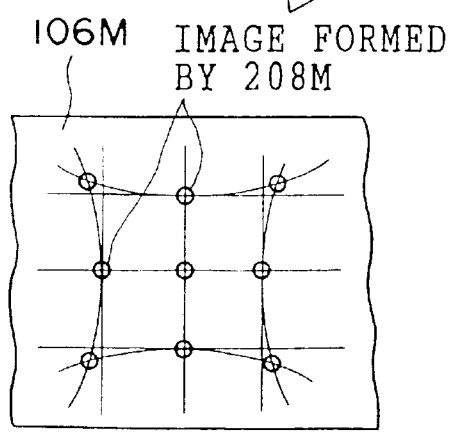
FIG. 7C is a plan view of a photosensitive material, on the surface of which a pincushion distorted image is formed.
Figure 7D:
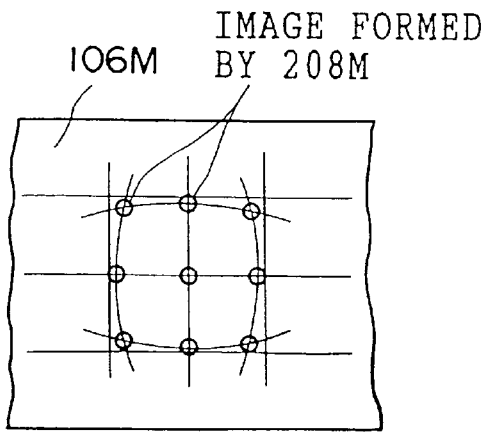
FIG. 7D is a plan view of a photosensitive material, on the surface of which a barrel distorted image is formed.

However, in actuality, distortion is caused by distortion aberration of the lens 212. FIG. 7A shows a simplified structure of the exposure unit 200 shown in FIG. 4 (the same reference numerals are respectively assigned to the elements corresponding to those in FIG. 4 with an "M" added after each of the reference numerals. Further, three LED chips 208M are provided for each color giving a total of nine LED chips 208M). The LED chips 208M mounted on a substrate 210M are, as shown in FIG. 7B, arranged in longitudinal and transverse directions. On the other hand, two types of distortion occur, namely, pincushion distortion (see FIG. 7C) and barrel distortion (see FIG. 7D). The size or form of the distortion varies depending on the optical system to be used (the degree of lens aberration, the length of an optical path, focal length, and the like) and is set by determining the setting conditions such as the arrangement of the optical system.

In the present embodiment, barrel distortion is generated, and therefore, the LED chips 208 mounted on the substrate 210 are not exactly arranged along longitudinal and transverse directional lines as shown in FIG. 5, instead the arrangement of the LED chips 208 is determined based on a calculation, which will be described later.

In the present embodiment, prior to the process for arranging the LED chips 208 on the substrate 210, a model of a system which allows image recording is actually prepared (or an actual device may be used), the LED chips 208 disposed in a theoretical arrangement pitch are turned on, the distance between a theoretical imaging point of one LED chip which is located farthest from the optical axis and the center of the lens (i.e., optical axis), and the distance between an actual imaging point and the center of the lens are measured. On the basis of the difference in the measured distances (in the present embodiment, an increasing ratio) as a reference, the mounting positions of the LED chips 208 are moved in advance in a direction opposite to that of the displacement caused by the distortion aberration, in accordance with the differences between the theoretical imaging points and the actual imaging points of the other LED chips 208.

Namely, the further the LED chip is disposed from the optical axis, the larger the amount of displacement thereof becomes, and the nearer the LED chip is disposed to the optical axis, the smaller the amount of displacement thereof becomes. As a result, the LED chips 208 are arranged on the substrate 210 in a so-called pincushion distortion configuration so as to compensate for the form of distortion aberration appearing on an imaging surface (i.e., barrel distortion).

In the light source portion 204 having the above-described structure, eleven main scanning lines can be recorded on the photosensitive material 106 in one main scanning operation for each of the colors. The main scanning line pitch numbers are ten (an even number).

Figure 8:
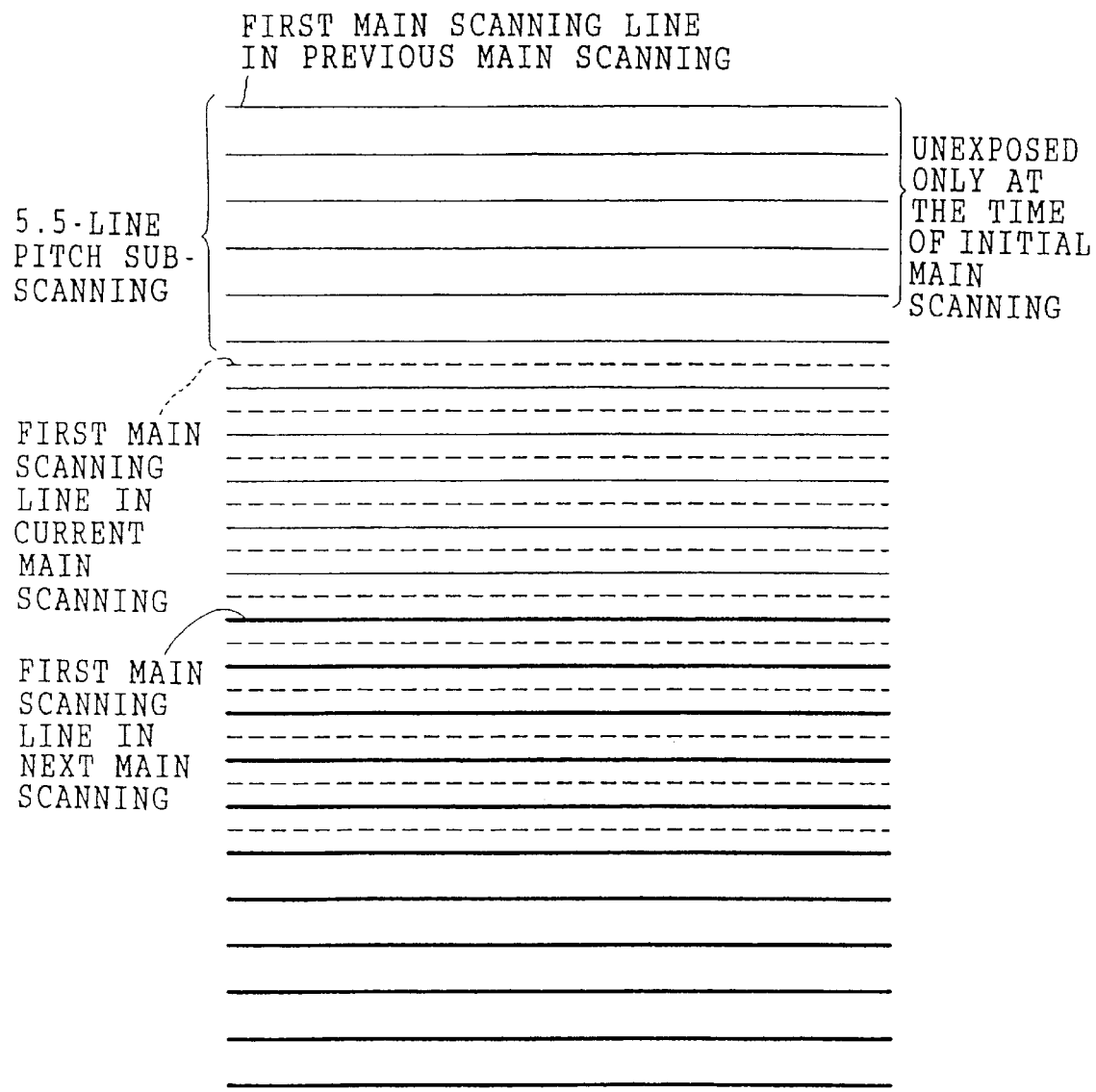
FIG. 8 is a plan view of a photosensitive material, which shows a state of main scanning lines and sub-scanning pitches.

In the present embodiment, the stepwise movement of the photosensitive material 106 is controlled so that sub-scan driving and stopping are repeated at a pitch (5.5-line pitch) in which the first main scanning line recorded on the photosensitive material 106 comes to an intermediate position between the sixth and seventh main scanning lines in the previous main scanning operation. In FIG. 8, solid thin lines indicate main scanning lines formed by the previous main scanning operation, broken lines indicate main scanning lines formed by the current main scanning operation, and solid thick lines indicate main scanning lines formed by the next main scanning operation.

As described above, the number of the LED chips 208 are set at an odd number (namely, the pitch numbers are ten) and a main scanning line is additionally formed between the main scanning lines so as to double the resolution. Further, with the number of LED chips 208 being set at an odd number, the sub-scan pitch can be made uniform. Further, scanning lines are not written between two adjacent scanning lines from the first to fifth main scanning lines during the first main scan driving owing to system control.

Reservoir Portion

The reservoir portion 170 is, as described above, disposed between the exposure section 176 and the water applying portion 178 and is formed by two pairs of nip rollers 192 and 194 and one dancer roller 196. The photosensitive material 106 is entrained between the two pairs of nip rollers 192 and 194 and a substantially U-shaped slack portion is formed in the photosensitive material 106 between these pairs of nip rollers. The dancer roller 196 moves up and down correspondingly to the amount of slack so as to maintain the amount of slack in the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, a difference in the conveying speed of the photosensitive material 106 is generated between the exposure section 176 and the water applying portion 178. In order to absorb the difference in the conveying speed, the dancer roller 196 moves up and down to adjust the amount of slack formed in the photosensitive material 106, so that the stepwise movement and the constant-speed movement of the photosensitive material 106 can be carried out simultaneously.

Next, operation of the present embodiment will be described.

The overall flow of an image recording operation will be first described.

In a state in which the tray 144 has been loaded into the tray loading aperture 146, and the feed reel 152 onto which the photosensitive material 106 has been completely taken up, and the take-up reel 154 which is in an empty state, have been mounted in their respective predetermined positions, and also when loading has been completed, then when the printing start key of the operation display portion 112 is operated, the controller 202 reads and stores image data from the CD-ROM 102 or the FD 104.

When the image data is stored in the controller 202, the feed reel 152 is driven to start conveying the photosensitive material 106.

When the photosensitive material 106 arrives at a predetermined position in the exposure section 176, the photosensitive material 106 is stopped temporarily and image signals are outputted from the controller 202 to the full-color-image forming light source portion 204. The image signals are outputted every ten lines and the full-color-image forming light source portion 204 is guided along the guide shaft 218 by the driving of the stepping motor 226 to move along the transverse direction of the photosensitive material 106 (main scanning). Prior to the outputting of the image signals, the amount of light for each of the colors from the full-color-image forming light source portion 204 is detected by the photodiode 228, and in the light-amount correction unit 230, a correction value for adjustment of the density, color balance, and the like is supplied to the controller 202, to thereby correct the image signal. This correction of the image signal is made for each image.

When the first main scanning is completed, the photosensitive material 106 is moved by one step (5.5-line pitch) and stops, and subsequently, the second main scanning is effected. By repeating the above main scanning, an image of one frame is recorded on the photosensitive material 106. The photosensitive material 106 on which the image has been recorded is held by the drive of the upstream side nip roller pair 192 only in the reservoir portion 170 (the downstream side nip roller pair 194 is stopped), in a state of having a slack portion in the reservoir portion 170 able to be entrained onto the dancer roller 196. For this reason, the above photosensitive material 106 is disposed so as not to reach the water applying portion 178.

When the photosensitive material 106 having a length of one image is accumulated in the reservoir portion 170, the nip roller pair 194 on the downstream side of the reservoir portion 170 starts driving. As a result, the photosensitive material 106 (with images having been recorded thereon) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, the proper amount of water is applied to the photosensitive material 106.

The photosensitive material 106 to which water is applied is guided by the guide plate 172 and is conveyed to the third roller pair 166.

On the other hand, the peripheral surface of the semicircular roller 156 and the leading end of the image receiving paper 108 are made to contact each other by one rotation of the semicircular roller 156, and the uppermost sheet of the image receiving paper stack 108 is pulled out and nipped by the first roller pair 160. The image receiving paper 108 is pulled out from the tray 144 by being driven by the first roller pair 160 and waits for the arrival of the photosensitive material 106 in a state of being nipped by the second roller pair 162.

Synchronously with the passing of the photosensitive material 106 through the guide plate, the first roller pair 160 and the second roller pair 162 start driving and the image receiving paper 108 is guided by the guide plate 164 and conveyed to the third roller pair 166.

The photosensitive material 106 and the image receiving paper 108 are nipped by the third roller pair 166 in a laminated state and are conveyed to the heat roller 174. At this time, the photosensitive material 106 and the image receiving paper 108 closely contact each other due to the water applied to the photosensitive material 106.

The photosensitive material 106 and the image receiving paper 108 in a laminated state are entrained onto the heat roller 174 and are subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed with the image receiving paper 108 in a state of being wound onto the heat roller 174 by a length of about one third the total circumference of the roller, and subsequently, the image receiving paper 108 is separated from the photosensitive material 106 by the peeling roller 184 and the peeling claw 186, and is entrained by the peeling roller 184 to be discharged onto the discharge tray 140.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

Mounting of the LED chips 208 on the substrate 210 in the light source portion 204 according to the present embodiment is determined as shown in FIG. 5, in light of distortion caused by distortion aberration of the lens 212 into consideration, with respect to the theoretical mounting position (see FIG. 6) and in accordance with the type of the distortion and the size or shape of the distortion (in the present embodiment, barrel distortion arises).

First, prior to the process for arranging the LED chips 208 on the substrate 210, a model of a system in which an image is recorded is actually prepared (or an actual device may be used), and the LED chips 208 are turned on in a theoretical arrangement pitch.

Subsequently, one LED chip 208 located at a position farthest from the optical axis is selected, and the ratio of the difference between the distance from the theoretical imaging point of the selected LED chip 208 to the center of the lens (i.e., the optical axis), and the distance from the actual imaging point to the center of the lens, namely, an increasing ratio is calculated.

The increasing ratio obtained by calculation is corrected so that, the further the LED chip is located from the optical axis, the larger the amount of displacement thereof becomes, and the nearer the LED chip is located to the optical axis, the smaller the amount of displacement thereof becomes. As a result, the LED chips are arranged in a so-called pincushion distortion configuration so as to compensate for the form of distortion aberration appearing on an imaging surface (i.e., barrel distortion). As a result, the main scanning line pitch on the imaging surface, i.e., the photosensitive material 106 becomes uniform as shown in FIG. 8.

In the present embodiment, the distortion aberration appears in the form of the barrel distortion, and therefore, the positions where the LED chips 208 are arranged are shifted in the direction of diffusion with respect to the theoretical arrangement. However, when the distortion aberration appears in the form of the pincushion distortion, the positions where the LED chips 208 are arranged are shifted in the direction of contraction with respect to the theoretical arrangement. Further, the above directions of diffusion and contraction may be inverted depending on the properties of the lens 212.

Further, in FIG. 6, the further the LED chips 208 are located from the optical axis with respect to the arrangement shown in FIG. 5, the larger the increasing ratio in the direction of diffusion becomes, however, the amount of displacement is not necessarily determined by calculation and varies depending on the type and material of the lens 212, manufacturing errors in the lens, and the state of any impurities contaminated therein. The state in which the LED chips 208 are mounted on the substrate 210 is not unconditionally determined as being the form of arrangement shown in FIG. 6. At the least, it is sufficient if the LED chips 208 are moved into a configuration opposite that of the distortion aberration (namely, pincushion distortion or barrel distortion). It is preferable that the amount and direction of displacement of the LED chips 208 be determined by actually using the lens to be applied and observing the imaging surface.

According to the present embodiment, image recording can be effected with a compact structure, and further, rapid capture of image data can be achieved owing to the CD-ROM deck 124 and the FD deck 126 being mounted within the apparatus. Moreover, the image to be recorded can be confirmed by the monitor portion 114, thereby facilitating adjustment of density and color balance.

Further, the discharge tray 140 is able to be accommodated inside the apparatus. Therefore, when the apparatus is not in use, by removing the tray 140 having the image receiving papers 108 accommodated therein, the external shape of the apparatus can be made to have fewer projecting portions. As a result, a working space can be effectively utilized.

In addition, in the apparatus according to the present embodiment, the water applying portion 178 and the exposure section 176 are disposed fixedly with respect to the direction in which the photosensitive material 106 is conveyed. Further, relative movement of the apparatus in the sub-scanning direction with respect to the photosensitive material 106 is entirely achieved by movement of the photosensitive material 106, and therefore, the moving mechanism becomes simple.

In addition, the present embodiment is provided so that the CD-ROM deck portion 124 and the FD deck portion 126 are loaded in the apparatus, but a deck portion in which other recording medium (for example, a photo-magnetic disk (MO), a phase-change disk (PD), a video tape, and the like) can be loaded may also be provided. Further, an image input terminal which is used to take in an image signal from outside (for example, a personal computer, a television, and the like) can also be provided.

As described above, the present invention has an excellent effect in that, when light from a plurality of point light sources is used, by a single imaging lens, to form an image, lens aberration is corrected and the image is formed in a desired position.

Further, the present invention also has an excellent effect in that, when an image is recorded by main scanning and sub-scanning of a plurality of point light sources, non-uniformity of the intervals of the main scanning lines caused by the lens aberration is prevented and image quality can be improved.

What is claimed is:

1. An optical system comprising a light source portion having a plurality of point light sources mounted on a substrate, and a single imaging lens system which allows light from the light source portion to form an image, wherein the point light sources on the substrate are arranged, based on optical properties of the imaging lens system including distortion aberration, so that respective images of the point light sources at image surface focal positions are positioned so as to accurately produce the image, and further wherein said distortion aberration includes a form of distortion aberration produced at the image surface focal positions which is one of pincushion distortion or barrel distortion.

2. An optical system comprising a light source portion having a plurality of point light sources mounted on a substrate, and a single imaging lens system which allows light from the light source portion to form an image, wherein the point light sources on the substrate are arranged, based on optical properties of the imaging lens system including distortion aberration, so that respective images of the point light sources at image surface focal positions are positioned so as to accurately produce the image, and further wherein the plurality of point light sources is arranged on the substrate based on the ratio of the difference between the distance to an optical axis from a theoretical imaging point of one of the point light sources, which is disposed farthest from the optical axis, and the distance from an actual imaging point to the optical axis.

3. An optical system comprising a light source portion having a plurality of point light sources mounted on a substrate, and a single imaging lens system which allows light from the light source portion to form an image, wherein the point light sources on the substrate are arranged, based on optical properties of the imaging lens system including distortion aberration, so that respective images of the point light sources at image surface focal positions are positioned so as to accurately produce the image, and further wherein the plurality of point light sources comprises a blue light emitting LED group, a green light emitting LED group, and a red light emitting LED group.

4. A method for arranging point light sources on a substrate in an optical system comprising a light source portion having a plurality of point light sources mounted on the substrate, and a single imaging lens system which allows light from the light source portion to form an image, said method comprising the steps of:

setting a relative positional relationship among the point light sources, the imaging lens system, and imaging surface focal positions;

determining whether a form of distortion aberration produced at the imaging surface focal positions is pincushion distortion or barrel distortion in the set relative positional relationship;

obtaining a form of distortion aberration to compensate for the determined distortion aberration, based on a degree of the determined distortion aberration; and determining an arrangement of the plurality of point light sources on the substrate in the form of the obtained distortion aberration and based on an inverse number of the imaging magnification.

5. A method for arranging point light sources on a substrate according to claim 4, wherein the plurality of point light sources is arranged on the substrate based on the ratio of the difference between the distance to an optical axis from a theoretical imaging point of one of the point light sources, which is disposed farthest from the optical axis, and the distance from an actual imaging point to the optical axis.

6. A method for arranging point light sources on a substrate according to claim 5, wherein the plurality of point light sources comprises a blue light emitting LED group, a green light emitting LED group, and a red light emitting LED group.

7. An image scanning exposure apparatus comprising:

a light source portion having a plurality of point light sources mounted on a substrate;

a single imaging lens system which allows light from the plurality of point light sources to form an image on a photosensitive material;

a main scan driving system which moves a unit, in which said light source portion and said imagine lens system are integrally structured, in a predetermined main scanning direction; and a sub-scan driving system which moves the photosensitive material stepwise in a direction perpendicular to the main scanning direction for each main scanning operation, wherein the point light sources on the substrate are arranged, based on optical properties of said imaging lens system including distortion aberration, so that respective images of the point light sources are arranged in straight lines on the photosensitive material in longitudinal and transverse directions, and further wherein said distortion aberration includes a form of distortion aberration produced on the photosensitive material which is one of pincushion distortion or barrel distortion.

8. An image scanning exposure apparatus comprising:

a light source portion having a plurality of point light sources mounted on a substrate;

a single imaging lens system which allows light from the plurality of point light sources to form an image on a photosensitive material;

a main scan driving system which moves a unit, in which said light source portion and said imagine lens system are integrally structured, in a predetermined main scanning direction; and a sub-scan driving system which moves the photosensitive material stepwise in a direction perpendicular to the main scanning direction for each main scanning operation, wherein the point light sources on the substrate are arranged, based on optical properties of said imaging lens system including distortion aberration, so that respective images of the point light sources are arranged in straight lines on the photosensitive material in longitudinal and transverse directions, and further wherein the plurality of point light sources is arranged on the substrate based on the ratio of the difference between the distance to an optical axis from a theoretical imaging point of one of the point light sources, which is disposed farthest from the optical axis, and the distance from an actual imaging point to the optical axis.

9. An image scanning exposure apparatus according to claim 8, wherein the plurality of point light sources comprises a blue light emitting LED group, a green light emitting LED group, and a red light emitting LED group, each of the LED groups being arranged in a direction parallel to the main scanning direction of the photosensitive material.

10. An image scanning exposure apparatus according to claim 9, wherein the photosensitive material is a full-color-image forming photosensitive material.

11. An image scanning exposure apparatus according to claim 10, further comprising a heat-development and transfer mechanism which, after the full-color-image forming photosensitive material is subjected to scanning and exposure processing by the plurality of point light sources, allows heat-development of an image formed on the full-color-image forming photosensitive material in a state in which the full-color-image forming photosensitive material and an image receiving paper are laminated to each other so as to transfer the image onto the image receiving paper.

12. An image scanning exposure apparatus according to claim 11, wherein a water applying mechanism is disposed at an upstream side of said heat-development and transfer mechanism in a direction in which the photosensitive material is conveyed, and is provided to apply water to at least one of the full-color-image forming photosensitive material and the image receiving paper.

13. An image scanning exposure apparatus according to claim 12, wherein a peeling mechanism is disposed at a downstream side of said heat-development and transfer mechanism in the direction in which the photosensitive material is conveyed, and is provided to separate the photosensitive material and the image receiving paper from each other.

* * * * *

UNITED STATES PATENT AND TRADEMARK OFFICE
CERTIFICATE OF CORRECTION

PATENT NO.   : 6,094,254
DATED        : July 25, 2000
INVENTOR(S)  : Futoshi Yoshida It is certified that error appears in the above-identified patent and that said Letters Patent is hereby corrected as shown below:

On the title page:

In the "References Cited", please change U.S. Patent No. from "4,987,540", to --4,987,450--.

Signed and Sealed this

Twenty-fourth Day of April, 2001

*Attest:*

NICHOLAS P. GODICI

*Attesting Officer*     *Acting Director of the United States Patent and Trademark Office*